United States Patent
Huang et al.

(10) Patent No.: US 6,585,782 B2
(45) Date of Patent: Jul. 1, 2003

(54) MIXTURES OF REACTIVE DYES AND THEIR USE

(75) Inventors: Huei Ching Huang, Ba Te (TW); Mao Cheng Hsu, Pina Zhen (TW); Bao-Kun Lai, Taoyuan Hsien (TW); Ya-Chi Tseng, Pin Zhen (TW)

(73) Assignee: Everlight USA, Inc., Pineville, NC (US)

( * ) Notice: Subject to any disclaimer, the term of this patent is extended or adjusted under 35 U.S.C. 154(b) by 116 days.

(21) Appl. No.: 09/793,625

(22) Filed: Feb. 27, 2001

(65) Prior Publication Data

US 2002/0162178 A1 Nov. 7, 2002

(51) Int. Cl.⁷ .......................... C09B 67/22; D06P 1/384
(52) U.S. Cl. ................................ 8/549; 8/641
(58) Field of Search ..................... 8/549, 641; 534/764

(56) References Cited

U.S. PATENT DOCUMENTS 5,690,699 A * 11/1997 Hannemann et al.
6,036,732 A * 3/2000 Pedemonte et al.
6,171,349 B1 * 1/2001 Lai et al.
6,238,442 B1 * 5/2001 Schumacher et al.

* cited by examiner

*Primary Examiner*—Margaret Einsmann
(74) *Attorney, Agent, or Firm*—Bacon & Thomas, PLLC

(57) ABSTRACT

Reactive dye mixtures comprising a black or navy reactive dye and a reactive disazo dye. The reactive dye mixtures of the present invention are suitable for exhaust dyeing, printing, continuous dyeing or discharge printing of a blended or interwoven fabric of cellulose fibres or cellulose nylon blends. The compounds of the present invention display good level dyeing properties, good build up and excellent low nylon cross-dyeing.

7 Claims, No Drawings

MIXTURES OF REACTIVE DYES AND THEIR USE

BACKGROUND OF THE INVENTION

1. Field of the Invention

The present invention relates to mixtures of reactive dyes, which are particularly suitable for dyeing fabric materials. They display good build-up, wash fastness, and levelness; especially low nylon cross-staining in blended and interwoven fabrics.

2. Description of the Related Art

To date it has been difficult to find a single reactive dye which displays good build-up to heavy black shades. In order to gain good build-up in black shades, a reactive dye composition, which contains a number of reactive dye components, has been used.

One black reactive dye (for example, the following formula (I) black reactive dye) as the major component is usually mixed

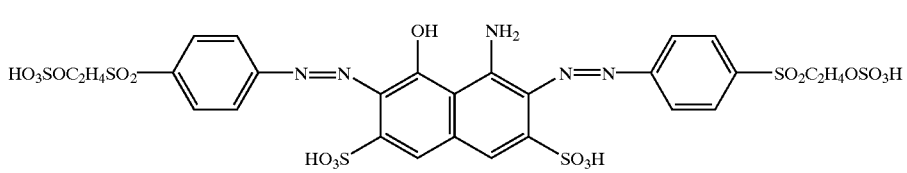

(I)

with red, orange, yellow or other shade reactive dyes to yield black reactive dye compositions.

Black reactive dye compositions are already known from Japanese Patent Laid-open No. 58-160362, 63-178170, 1-315469, 2-73870, 2-202956, 8-104822, and 8-253697, and U.S. Pat. Nos. 5,445,654, 5,611,821, 5,780,602, 5,849,887, 5,931,974 and 6,127,700.

In order to achieve high quality fabric, a blended or interweave fabric, which contains two different fibers, has been produced and sold in the market.

When dyeing the blended fabrics, problems can be encountered in off-tone dyeing because different fibres have different affinities for the dyestuffs. Especially when dyeing nylon/cellulose blended fabrics, it is difficult to get a low nylon cross-staining product. Therefore it is necessary to select appropriate dyestuffs when dyeing blended or interwoven fabrics.

There are many black reactive dye compositions which can be chosen in the market. However the black dye compositions with little nylon cross-staining always show poor properties in levelness and build-up. Conversely, black dye compositions with good properties in levelness and build up always stain nylon badly.

Therefore, there is a strong demand for a reactive black dye composition having good dyeing properties and low nylon cross-staining.

SUMMARY OF THE INVENTION

It is one object of the present invention to provide a reactive black dye composition that is suitable for use in exhaustion, printing, continuous dyeing or discharge printing of fibers to provide good dyeing properties.

Other objects of the present invention are to provide a reactive dye composition, which has good build-up properties, wash fastness, wash-off, levelness and low nylon cross-staining of blended or interwoven fabrics.

The reactive dye composition of present invention comprises: one or more, such as one, two or three, disazo dyes conforming to component (A), one or more, such as one, two or three, disazo dyes conforming to component (B) and optionally one or two monoazo dyes conforming to component (C).

Component (A) is selected from disazo dyes which may be represented by formula (I) to formula (III),

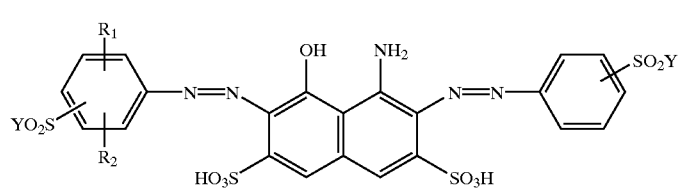

(I)

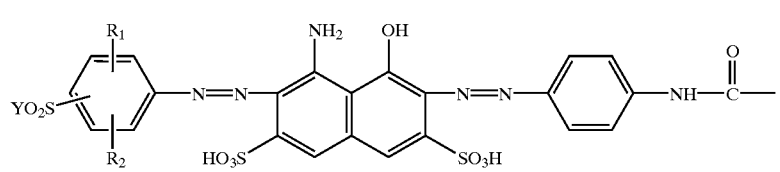

(II)

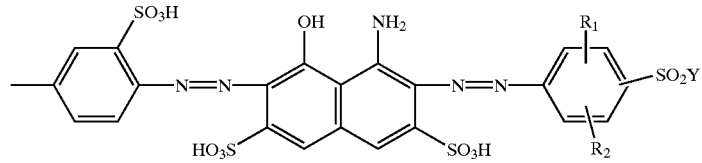

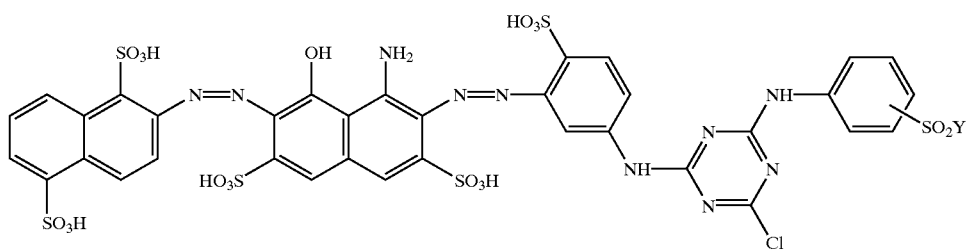

(III)

wherein Y is —CH=CH₂ or —C₂H₄W, W is a leaving group which can be eliminated by a base; $R_1$ and $R_2$ are each independently hydrogen, methyl, ethyl, methoxy, ethoxy or sulfonic acid, preferably hydrogen or methoxy, and most preferably hydrogen. The leaving group W is for example, —Cl, —Br, —F, —OSO₃H, —SSO₃H, —OCO—OCH₃, —OPO₃H₂, —OCO—C₆H₅, —OSO₂—(C₁-C₄-alkyl) or —OSO₂—N(C₁-C₄-alkyl)₂. W is preferably —Cl, —OSO₃H, —SSO₃H, —OCO—CH₃, —OCO—C₆H₅ or —OPO₃H₂, more preferably —Cl or —OSO₃H and, particularly preferably, —OSO₃H.

Component (B) is selected from the reactive disazo dye which may be represented by formula (IV) to formula (XI), (IV)
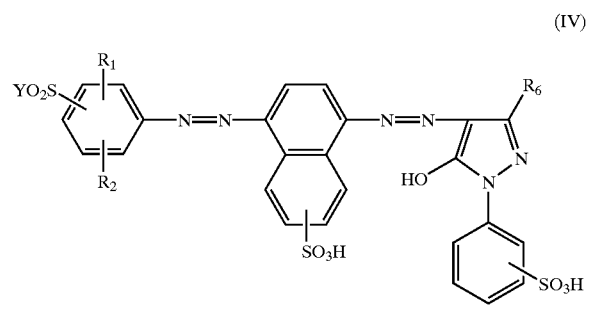

(V)
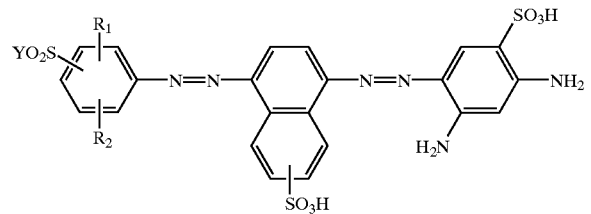

(VI)
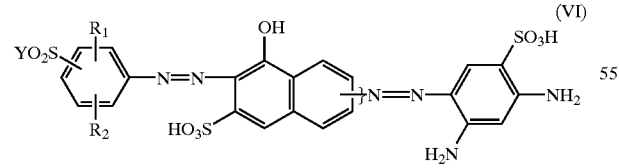

(VII)
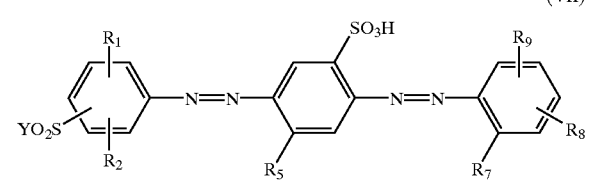

(VIII)
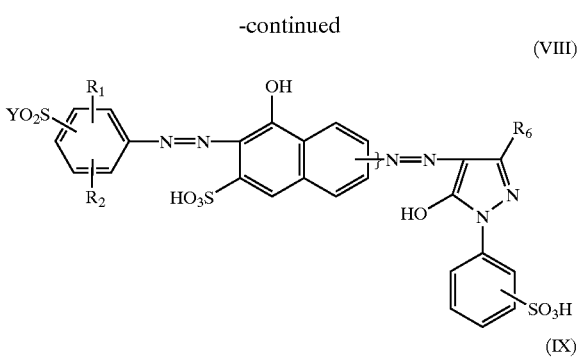

(IX)
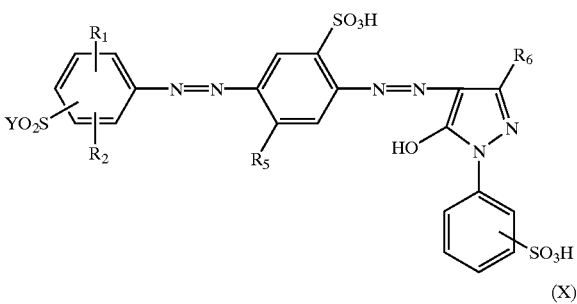

(X)

(XI)
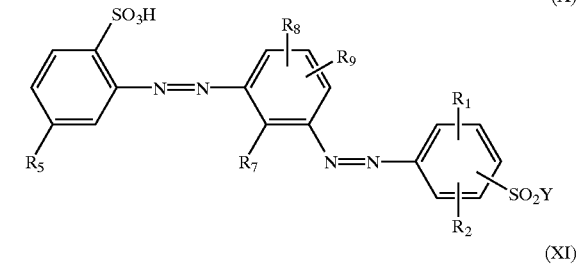

wherein Y, $R_1$ and $R_2$ are defined as the above; $R_3$ and $R_4$ are each independently hydrogen, methyl, ethyl, methoxy, ethoxy or sulfonic acid, preferably hydrogen or methoxy, particularly preferably hydrogen; $R_5$ is amino, —NHC₂H₄COOH or —NHCOCH₃; $R_6$ is methyl, ethyl, propyl or carboxylic acid; $R_7$ is amino, —NHC₂H₄COOH, —NHCONH₂ or —NHCOCH₃; $R_8$ and $R_9$ are each independently hydrogen, amino or sulfonic acid; and $R_{10}$ is —CH₂SO₃H or —CONH₂.

Furthermore, the reactive black dye composition of the present invention can contain component (C) with at least a reactive monoazo dye of formula (15), (16) or (17).

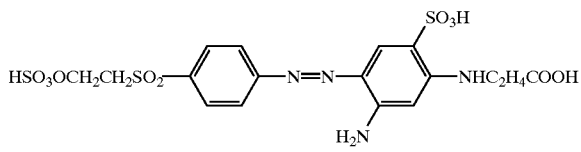
(15)

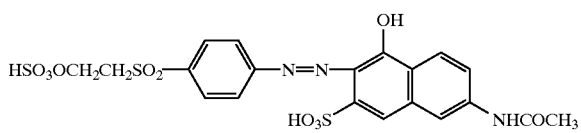
(16)

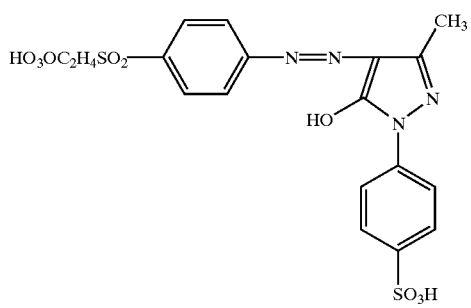
(17)

The dyestuffs of the present invention all contain anionic groups, such as a sulfonic acid groups: for convenience they are depicted as free acid in the specification. When the dyestuffs of the present invention are manufactured, purified or used, they exist in the form of water soluble salts, especially alkaline metallic salts, such as sodium salts, potassium salts or ammonium salts.

The ratio of each dye component can be changed over a wide range. In general, the minimum relative weight percentage for each dye component is 3%, and the maximum relative weight percentage is 90%. The dye composition of the present invention preferably contains component (A) 30~80% by weight, component (B) 25~75% by weight, and optionally component (C) 0~45% by weight.

DESCRIPTION OF THE PREFERRED EMBODIMENTS

The compounds represented by formula (I) of the present invention can be synthesized by the following method.

First, the diazonium salt derived from the amine of the formula (a)

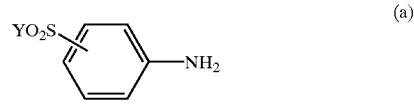
(a)

wherein Y, which is defined as the above, is coupled with compound (b)

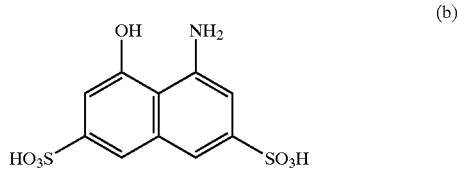
(b)

under acidic conditions. The monoazo compound thus obtained is then reacted with a diazonium salt, derived from an aromatic amine (c),

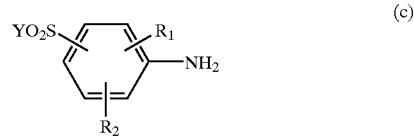
(c)

wherein Y, $R_1$, and $R_2$ are defined as above under a basic conditions to yield a compound of formula (I).

Examples of formula (I) are formula (1), formula (2) or formula (3).

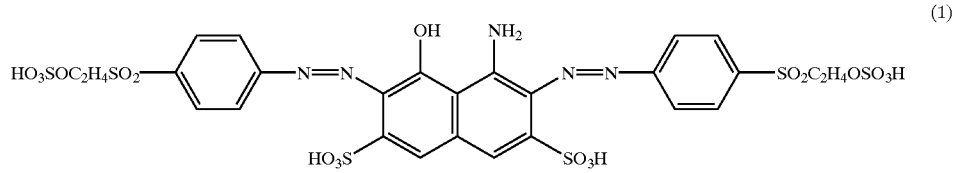
(1)

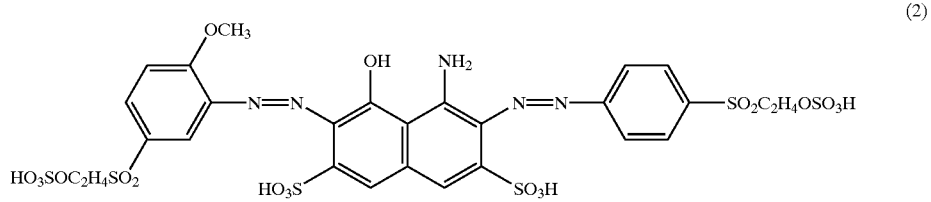
(2)

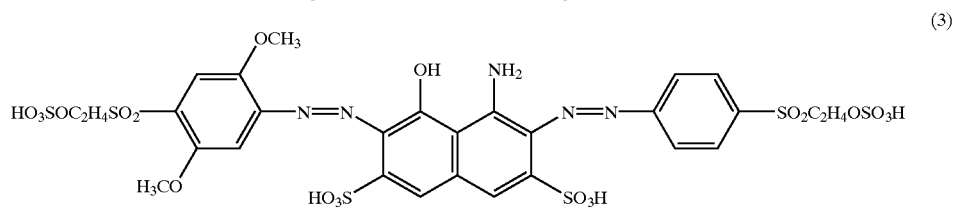
(3)

The compound of formula (II) can be synthesized by the following method.

First the tetrazonium salt derived from the aromatic diamine (d)

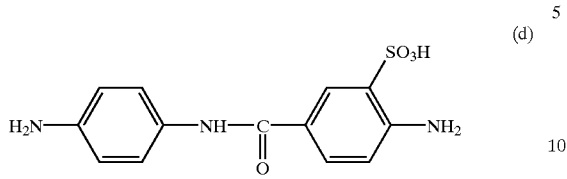
(d)

is coupled with a compound of formula (b) under acidic conditions. The compound thus obtained is then reacted with the diazonium salt derived from the amine (c) under basic conditions, to yield a compound of formula (II).

An example of formula (II) is formula (4).

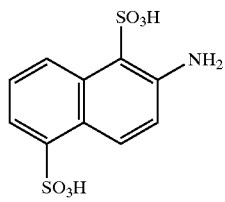
(g)

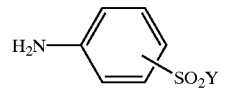
(h)

An example of a compound of formula (III) is a compound of formula (5).

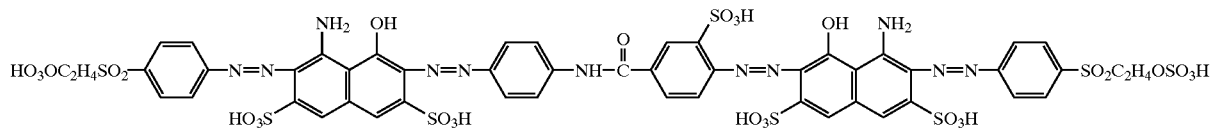
(4)

Compounds of formula (III) of the present invention can be synthesized by the following method.

First, the compound of formula (e) is condensed with compound of formula (f).

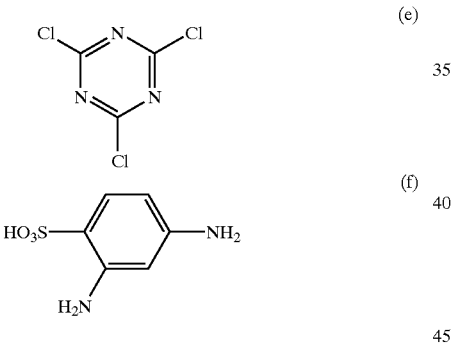
(e)

(f)

The resulting product is diazotised and the diazonium salt thus obtained is coupled with a compound of formula (b), under acidic conditions, then coupled with the diazonium salt derived from amine (g), under basic conditions. Finally it is condensed with a compound of formula (h) to yield a compound of formula (III), wherein Y is defined as above.

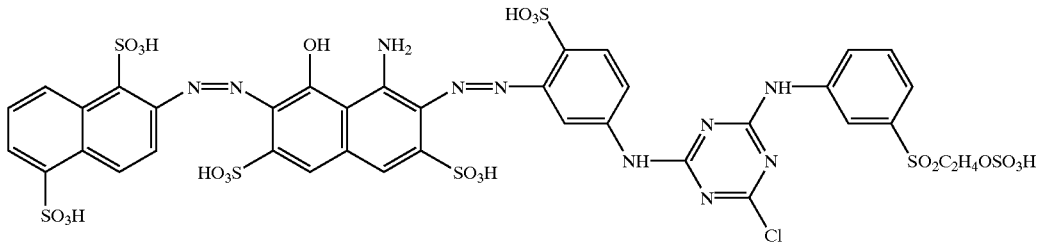
(5)

Compounds of formula (IV) and formula (V) of the present invention, can be synthesized by the following method. The diazonium salt derived from an amine (c) is coupled with a compound of formula (i),

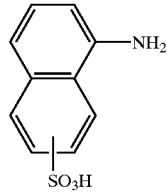
(i)

the resulting monoazo derivative is then diazotised and coupled with a compound of formula (j) or a compound of formula (k),

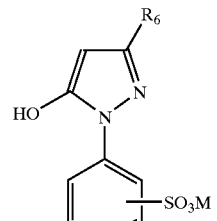
(j)

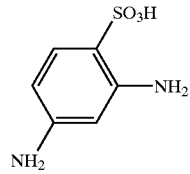
(k)

wherein $R_6$ is defined as the above.

Examples of compound of formula (IV) and (V) are formula (6) and (7).

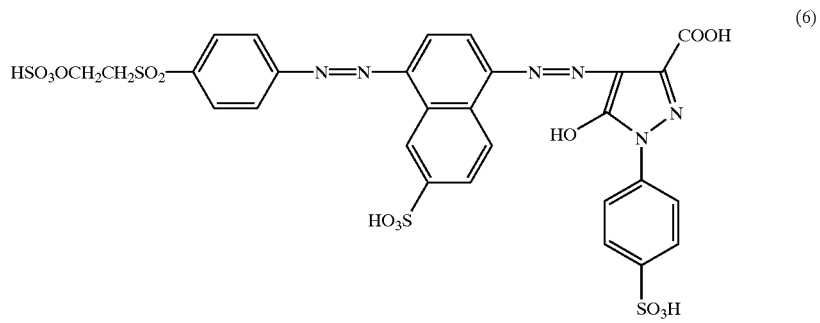
(6)

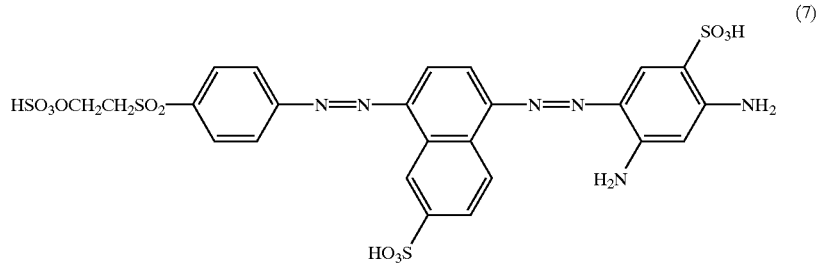
(7)

Compounds of formula (VI) and (VIII) can be synthesized by the following method.

The diazonium salt derived from amine (c) is coupled with a compound of formula (m), and the resulting monoazo derivative is

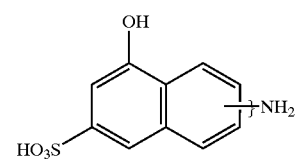
(m)

then diazotised. The diazonium salt thus obtained is coupled with a compound of formula (k) or (j).

Examples of formula (VI) are formula (8), (9) and an example of formula (VIII) is formula (10).

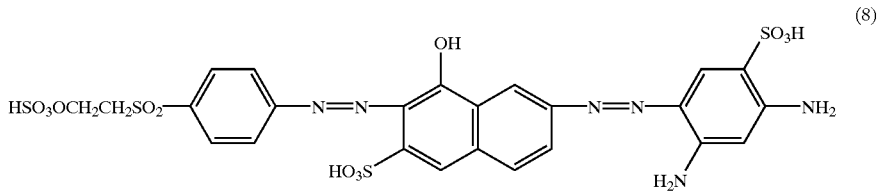

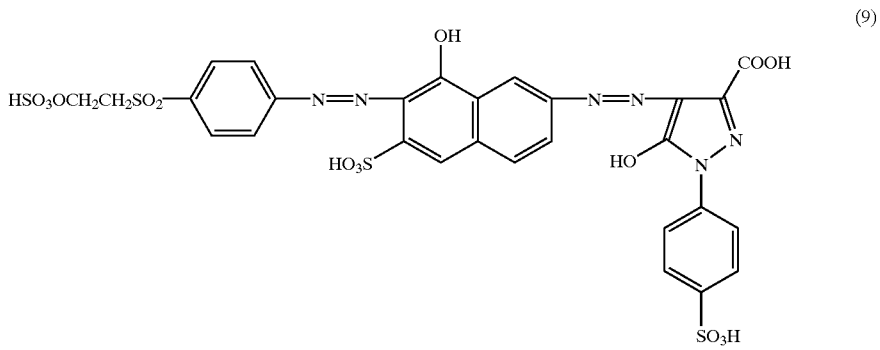

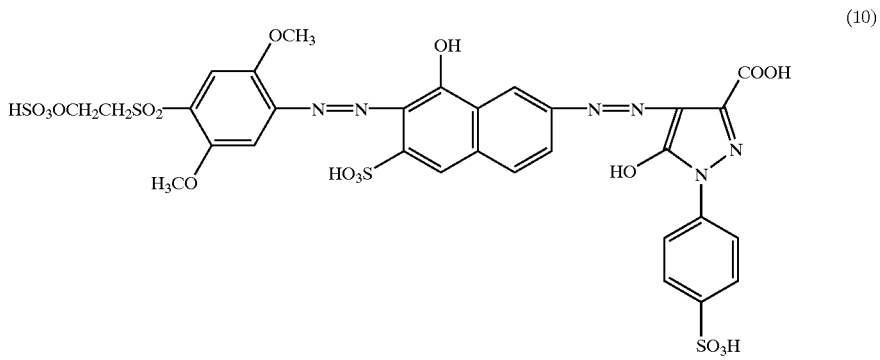

Formula (VII), (IX) and (XI) of the present invention can be synthesized by the following method.

The diazonium salt derived from amine (c) is coupled with a compound of formula (n)

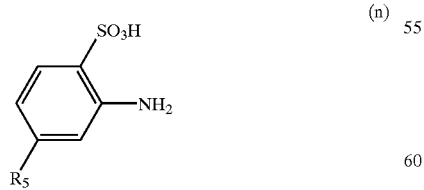

wherein $R_5$ is defined as above, and the resulting monoazo derivative is diazotised. The diazonium salt thus obtained is coupled with a compounds of formula (o), (p) or (q).

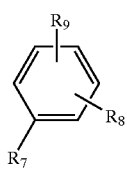

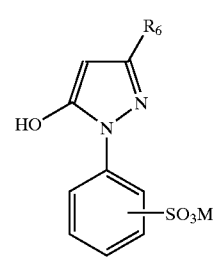

-continued (q)
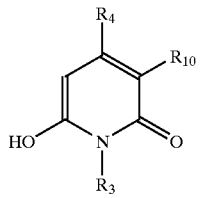

wherein $R_3$, $R_4$, $R_6$, $R_7$, $R_8$, $R_9$ and $R_{10}$ are defined as the above.

Examples of formula (VII), (IX) and (XI) are formulae (11), (12) and (13) respectively.

(11)
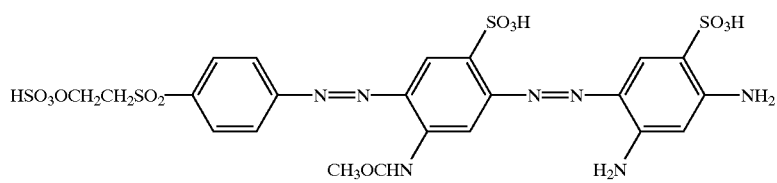

(12)
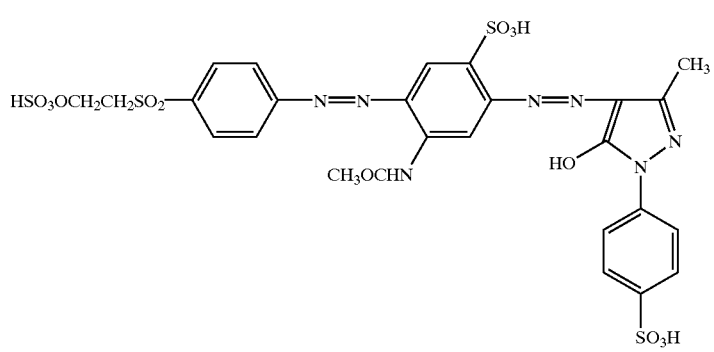

(13)
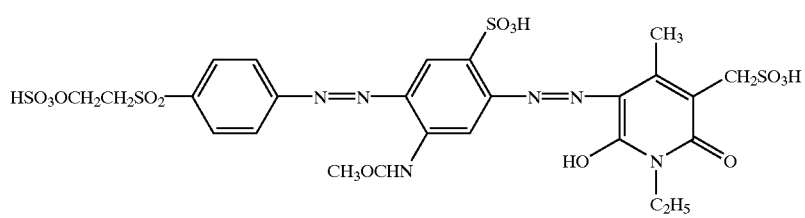

Compounds of formula (X) can be synthesized by the following method.

The diazonium salt derived from amine (s) is coupled with a compound of formula (o), then hydrolyzed in aqueous alkali at refluxing, to yield a compound of formula (t), (s)
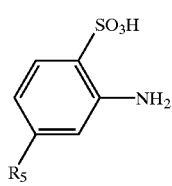

-continued (t)
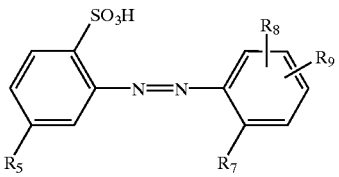

wherein $R_5$, $R_7$, $R_8$ and $R_9$ are defined as above. Finally, the compound of formula (t) is coupled with a diazonium salt derived from an amine (c).

An example of formula (X) is formula (14).

(14)
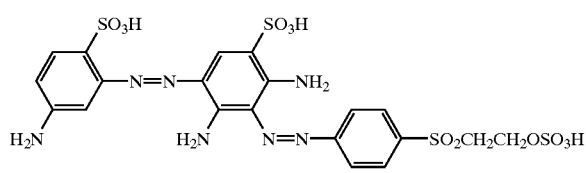

The compositions of the present invention can be prepared in many ways. For example, by using separately prepared dye components and mixing together to make powder, granular or liquid form, or by mixing a number of individual dyes as a dyeing recipe in a dye house. The dye mixtures of this invention can be prepared, for example, by mixing the individuals dyes. The mixing process is carried out, for example, in a suitable mill, e.g. in a ball mill, pin mill, or in kneaders or mixers. If the dyestuff mixtures of the invention are prepared by mechanical mixing of the individual dyestuffs, any necessary standardizing agents, dust removal agents or further auxiliaries, which are customary in dyeing, and are customary in dyestuff preparations, used in this context are added during mixing.

The dyestuffs of present invention can be in the form of powders, granules or liquids; and an auxiliary agent, for example, a retarding agent, leveling agent, assistant agent, surfactant, or dispersing agent may be added.

The dye compositions of the present invention can be in solid or in liquid form. In the solid form, they may generally contain electrolyte salts customary for water-soluble and in particular fiber-reactive dyestuffs, such as sodium chloride, potassium chloride and sodium sulfate. Furthermore they can contain auxiliaries customary in commercial dyestuffs, such as buffer substances, which are capable of establishing a pH in aqueous solution of between 3 and 7, such as sodium acetate, sodium borate, sodium bicarbonate, sodium dihydrogen phosphate, and disodium hydrogen phosphate or agents which improve the solubility, such as known naphthalenesulfonic acid-formaldehyde condensation products, methylnaphthalenesulfonic acid-formaldehyde condensation products, acetylaminonaphthol based compounds, etc. If they are liquid, aqueous solution (including the content of thickeners, such as are customary in printing pastes), they may contain dissolved the above-mentioned substances and may contain substances which ensure the storage stability of these preparations, such as mould-preventing agents.

The ratio of each dye component can be changed over a wide range. In general, the minimum relative weight percentage for each dye component is 3%, and the maximum relative weight percentage is 90%. The dye composition of the present invention preferably contains component (A) 30~80% by weight, component (B) 25~75% by weight, and optionally component (C) 0~45% by weight.

The black dye compositions of the present invention can be used to dye a wide range of natural and synthetic fibres which contain either amino or hydroxyl groups, such as wool, silk and synthetic polyamides. These dye compositions can also be used to dye natural cellulosic fibres such as cotton, linen, ramie, jute as well as regenerated cellulosic fibres. The dyeing method used is the one generally used when a reactive dyestuff is applied to the appropriate substrate. In the case of dyeing cellulose, the substrate is added to an aqueous bath containing the required amount of inorganic electrolyte (common salt or sodium sulfate) to achieve a high level of exhaustion. The covalent bond, connecting the dye to the cellulosic fibre, is formed on the addition of alkali (soda ash, sodium bicarbonate or caustic soda).

The black dye composition of the present invention is of high industrial importance. It allows level, heavy (deep black) shades to be obtained with minimal amounts of cross staining of polyamide when dyeing a cotton/nylon blend.

Many examples have been used to illustrate the present invention. The examples sited below should not be taken as a limit to the scope of the current invention. In these examples, the compound is represented by the free acid. However, in practice, it will exist as a (metal) salt, for example as the sodium, lithium, potassium or ammonium salt, particularly the sodium salt. In the following examples, quantities are given as parts by weight (%) and temperature are given in degree Celsius.

EXAMPLE 1

Formulate a mixture using 32.65 parts of dye of formula (1), 24.49 parts of dye formula (6) and 42.86 parts of dye of formula (15). The following dyeing processes were carried out.

(1) Exhaust Dyeing on Cotton
 a) Materials
  Bleached, unmercerised woven cotton (4 gm), Glaubers salt solution (240 g/l), soda ash solution (100 g/l), dilute acetic acid (10 g/l).
 b) Dyeing Parameters
  Depth of shade: 4% on weight of cotton
  Liquor ratio: 20:1
  Glaubers salt concentration: 60 g/l
  Soda ash concentration: 20 g/l
 c) Dyeing Procedure
  1. Take 1 part of the above dye composition and dissolve in 100 parts of distilled water.
  2. To a dyeing vessel containing 16 ml of the above dye solution, 20 mls of Glaubers salt solution and 28 mls of distilled water, add a 4 gm piece of bleached unmercerised cotton.
  3. Place the sealed dyeing vessel in a thermostatically controlled bath and heat from room temperature to 60° C. at approx. 5° C./minute. Maintain the dyeing vessel at this temperature for 30 minutes.
  4. Add 16 ml of soda ash solution to the dyeing vessel and return to the thermostatically controlled bath for a further 60 mins at 60° C.
  5. Remove the dyed cotton from the dyeing vessel and rinse well with cold water to remove chemicals and (some) loose colour.
  6. Rinse the dyed fabric in a solution of dilute acetic acid for 2 minutes in order to neutralise any, 'carry over' of alkali from the dyeing process.
  7. Treat the dyed cotton for 15 min. in boiling water containing 2 g/l of an anionic detergent.
  8. Rinse the cotton in warm water (60° C.), and then in cold water, (each for 2 minutes) and dry.
  9. Assess the shade on the cotton.
2. Nylon Staining Test
 (a) Materials
  Bleached unmercerised woven cotton (4 gm), knitted nylon (1 gm) and nylon taffeta (1 gm).
 (b) Dyeing Parameters
  Depth of shade: 4% on weight of cotton
  Glaubers salt concentration 60 g/l
  Soda ash concentration 20 g/l
 (c) Dyeing Procedure
  The same procedure was adopted as previously described, although the dyebath (final volume of 80 ml) contained samples of cotton (4 gm), knitted nylon (1 gm) and nylon taffeta (1 gm).
 (d) Estimation of Nylon Staining
  Assess the staining on the nylon fabric spectrophotometrically.

EXAMPLES 2–20

A series of different mixtures were formulated and dyed on cotton, using the procedure previously described in example 1, to yield deep black shades. The composition of the formulations are shown in Table 1.

The same formulations were also used to dye a mixture of cotton (4 gm) and nylon (2×1 gm) as described in the 'nylon staining test'. The amount and shade of the nylon staining is shown in Table 2. A commercially available reactive black formulation, known to give significant amounts of undesirable orange staining of the nylon was used as a control in the study.

The lower the value of 'chroma' (Table 2), the lower is the amount of nylon staining exhibited by a dyestuff formulation. A formulation exhibiting a small amount of on-tone (grey) staining of the nylon is highly desirable to avoid the formation of an unlevel ('skittery') dyeing and give good fastness properties. Table 2 clearly shows that the black dye compositions of the present invention show much superior technical performance (lower nylon cross-staining) than the existing commercial product.

TABLE 1

COMPOSITION OF BLACK FORMULATIONS

| Example No. | Component (A) Compound ratio | Component (B) Compound ratio | Component (B) Compound ratio | Component (C) Compound ratio |
|---|---|---|---|---|
| 2 | formula (1) 41.32% | formula (6) 39.67% | formula (13) 19.01% | — |
| 3 | formula (1) 30.59% | formula (11) 29.41% | — | formula (15) 40.00% |
| 4 | formula (1) 38.83% | formula (14) 20.71% | formula (11) 40.45% | — |
| 5 | formula (1) 61.16% | formula (8) 16.82% | formula (11) 22.02% | — |
| 6 | formula (1) 38.83% | formula (12) 20.71% | formula (11) 40.45% | — |
| 7 | formula (1) 53.33% | formula (7) 5.33% | formula (11) 41.33% | — |
| 8 | formula (1) 69.62% | formula (8) 30.38% | — | — |
| 9 | formula (1) 61.16% | formula (8) 16.82% | — | formula (16) 22.02% |
| 10 | formula (1) 53.33% | formula (7) 5.33% | — | formula (16) 41.33% |
| 11 | formula (1) 56.52% | formula (10) 8.70% | — | formula (16) 34.78% |
| 12 | formula (1) 40.00% | formula (10) 28.00% | — | formula (15) 32.00% |
| 13 | formula (1) 34.48% | formula (9) 51.72% | — | formula (16) 13.79% |
| 14 | formula (1) 41.82% | formula (9) 30.91 | — | formula (15) 27.27% |
| 15 | formula (1) 34.48% | formula (10) 51.72% | — | formula (16) 13.79% |
| 16 | formula (1) 30.49% | formula (13) 60.98% | formula (11) 8.54% | — |
| 17 | formula (4) 56.56% | formula (12) 27.15% | formula (11) 16.29% | — |
| 18 | formula (5) 40.00% | formula (12) 25.00% | formula (11) 35.00% | — |
| 19 | formula (2) 51.59% | formula (12) 19.48% | formula (11) 28.57% | — |
| 20 | formula (3) 50.63% | formula (12) 17.72% | formula (11) 31.65% | — |

TABLE 2

SHADE OF NYLON IN NYLON STAINING TEST

| Dye composition | Chroma | Shade of nylon |
|---|---|---|
| Control (commercially available sample) | 33.3 | Orange |
| Example 1 | 4.3 | (Greenish-) Grey |
| Example 2 | 6.1 | Grey |
| Example 3 | 2.6 | Grey |
| Example 4 | 5.9 | Grey |
| Example 5 | 4.4 | (Reddish-) Grey |
| Example 6 | 12.3 | Grey |
| Example 7 | 5.4 | Grey |
| Example 8 | 2.6 | Grey |
| Example 9 | 5.7 | (Reddish-) Grey |
| Example 10 | 13.2 | Grey |
| Example 11 | 10.2 | Grey |
| Example 12 | 4.3 | (Bluish-) Grey |
| Example 13 | 1.7 | Grey |
| Example 14 | 5.1 | (Bluish-) Grey |
| Example 15 | 6.8 | Grey |
| Example 16 | 4.5 | (Greenish-) Grey |
| Example 17 | 6.6 | Grey |
| Example 18 | 22.3 | (Reddish-) Grey |
| Example 19 | 12.2 | (Reddish-) Grey |
| Example 20 | 12.4 | (Reddish-) Grey |

The black dye composition of the present invention can be widely applied to substrates containing a hydroxyl group by the traditional dyeing methods such as exhaustion, printing and (semi-) continuous dyeing.

For cellulosic fibres, the black dye composition of the present invention is a dye composition with great industrial value. It has good build-up properties (to yield heavy black shades), can be dyed in a level/uniform manner, loose (hydrolysed) dye can be readily removed and exhibits good fastness properties. In particular, it exhibits minimal nylon cross-staining.

From the foregoing description, one skilled in the art can easily ascertain the essential characteristics of this invention, and without departing from the scope thereof, can make various changes and modifications of the invention to adapt it to various usages and conditions. Thus, other embodiments are also within the claims.

What is claimed is:

1. A reactive dye composition comprising:
(A) at least one reactive dye having a formula (I)

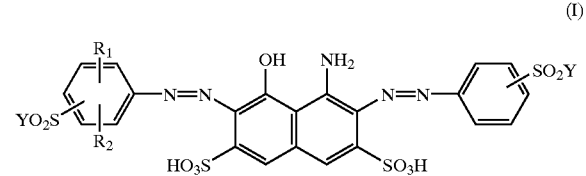

(I)

wherein Y is —CH═CH$_2$ or —C$_2$H$_4$W, W is a leaving group, R$_1$ and R$_2$ are each independently hydrogen, methyl, ethyl, methoxy, ethoxy or sulfonic acid; and (B) at least one diazo reactive dye which has a formula (IX),

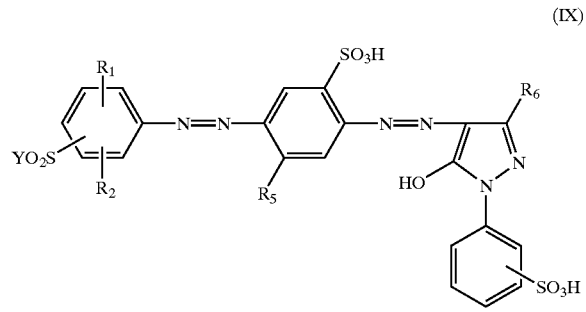

(IX)

wherein
Y, R$_1$ and R$_2$ are defined as above;
R$_5$ is amino, —NHC$_2$H$_4$COOH or —NHCOCH$_3$;
R$_6$ is methyl, ethyl, propel or carboxylic.

2. A dye mixture according to claim 1, where W is —Cl, —Br, —F, —OSO$_3$H —SSO$_3$H, —OCO—OCH$_3$, —OPO$_3$H$_2$, —OCO—C$_6$H$_5$, —OSO$_2$—(C$_1$–C$_4$-alkyl) or —OSO$_2$—N(C$_1$–C$_4$alkyl)$_2$.

3. A dye mixture according to claim 1, where W is —Cl or —OSO$_3$H.

4. The composition of claim 1, wherein the compound of formula (I) is the compound of formula (1)

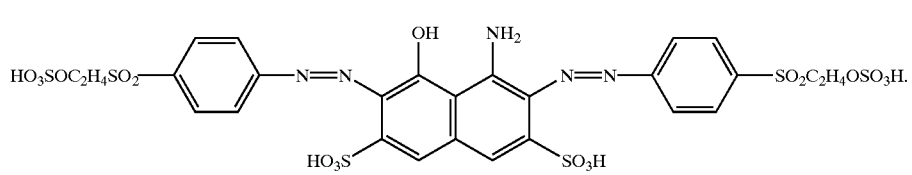

(1)

5. The composition of claim 1, wherein compound of formula (I) is the compound of formula (2)

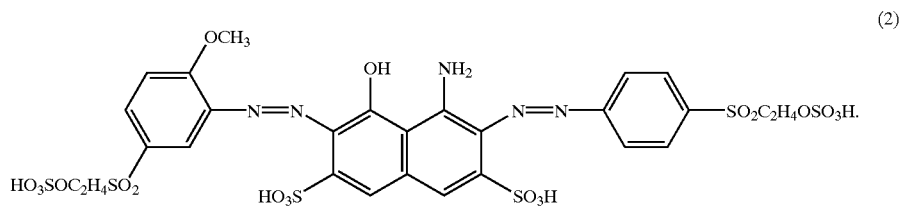

(2)

6. The composition of claim 1, wherein compound of formula (I) is the compound of formula (3)

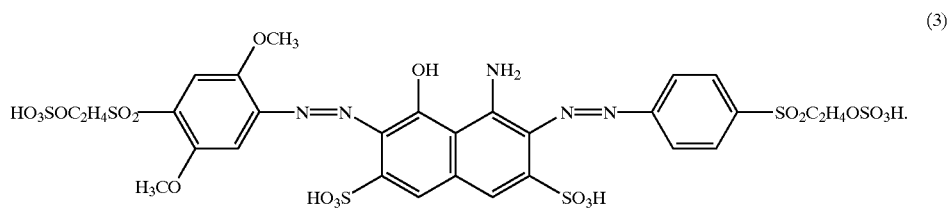

(3)

7. The composition of claim 1, wherein compound of formula (IX) is the compound of formula (12)

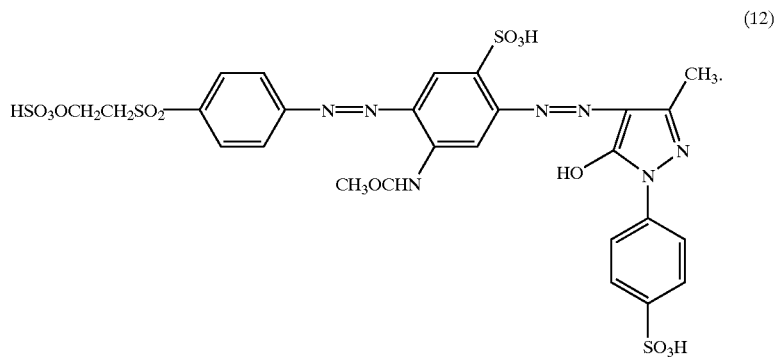

(12)

* * * * *